US008635653B2

(12) United States Patent
Carmichael

(10) Patent No.: US 8,635,653 B2
(45) Date of Patent: Jan. 21, 2014

(54) APPARATUS, SYSTEMS AND METHODS FOR OPTIMIZING THE SATELLITE TRANSPONDER USAGE

(75) Inventor: Leslie Carmichael, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 105 days.

(21) Appl. No.: 13/095,765

(22) Filed: Apr. 27, 2011

(65) Prior Publication Data

US 2012/0278843 A1 Nov. 1, 2012

(51) Int. Cl.
*H04N 7/20* (2006.01)

(52) U.S. Cl.
USPC .......... 725/63

(58) Field of Classification Search
USPC .......... 725/63, 67, 68, 91–96; 709/231
See application file for complete search history.

(56) References Cited

U.S. PATENT DOCUMENTS

| | | | | |
|---|---|---|---|---|
| 5,771,234 | A | 6/1998 | Wu et al. | |
| 6,721,957 | B1 | 4/2004 | Lawrence | |
| 6,868,452 | B1 * | 3/2005 | Eager et al. | 709/231 |
| 2003/0220072 | A1 * | 11/2003 | Coffin, III | 455/3.02 |
| 2008/0163311 | A1 * | 7/2008 | St. John-Larkin | 725/68 |
| 2009/0165057 | A1 * | 6/2009 | Miller et al. | 725/68 |
| 2010/0199301 | A1 | 8/2010 | Hayashi et al. | |
| 2010/0262999 | A1 | 10/2010 | Curran | |
| 2012/0110167 | A1 * | 5/2012 | Joch et al. | 709/224 |
| 2012/0113320 | A1 | 5/2012 | Platzer | |

FOREIGN PATENT DOCUMENTS

| | | | |
|---|---|---|---|
| EP | 2175651 | A1 | 4/2010 |
| WO | 2010145807 | A2 | 12/2010 |

* cited by examiner

*Primary Examiner* — Vivek Srivastava
*Assistant Examiner* — Aklil Tesfaye
(74) *Attorney, Agent, or Firm* — Lowe Graham Jones PLLC

(57) ABSTRACT

Systems and methods are operable to receive media content transport channels from multiple transponders. An exemplary embodiment receives a first transport channel, wherein the first transport channel comprises a first portion of a media content event of interest multiplexed together with a first plurality of media content events; receives a second transport channel, wherein the second transport channel comprises a second portion of the media content event of interest multiplexed together with a second plurality of media content events; demultiplexes the first portion of the media content event of interest from the first transport channel; and demultiplexes the second portion of the media content event of interest from the second transport channel.

20 Claims, 4 Drawing Sheets

APPARATUS, SYSTEMS AND METHODS FOR OPTIMIZING THE SATELLITE TRANSPONDER USAGE

BACKGROUND

Media devices, such as a set top box, are configured to receive media content events from a broadcasting system. Non-limiting examples of media content events include audio content, data content, books, industry data, movies, news programs, sporting events, serial comedies or dramas, and other program events that are communicated to a media device by a service provider over the broadcasting system. Non-limiting examples of broadcasting systems include satellite systems, cable or other wire-based systems, or over the air (OTA) broadcasting systems.

Media content events were traditionally encoded (i.e., moving pictures experts group (MPEG) standard) at a constant bit rate and transmitted over the broadcasting system to one or more media devices over a constant bit rate channel. For example, standard definition television (MPEG-2 compression) is often encoded at 3.5 megabits per second (Mbits/s). Therefore, the transport channel would need to have a constant throughput of at least 3.5 Mbits/s to transmit the television content.

It has become advantageous to encode media content events using a variable bit rate, because for certain types of media events, such as a television program, the amount of data that needs to be encoded varies over time. Variable bit rate media content streams are able to keep video quality constant, but vary the bit rate over time since the amount of data required between video frames fluctuates over time. For example, an inactive portion of the media content event requires less data than a portion where there is a large amount of action. Thus it would be inefficient to encode such content at a constant bit rate.

However because of this fluctuation, variable bit rate content can cause problems for the transmission of media content events. Such problems include limited throughput of a transport channel and/or under utilization of a transport channel or a component of a transport channel. Accordingly, there is a need to provide broadcast systems that can reliably and efficiently deliver variable bit rate media content events to media devices.

SUMMARY

Systems and methods are operable to receive media content transport channels from multiple transponders. An exemplary embodiment receives a first transport channel, wherein the first transport channel comprises a first portion of a media content event of interest multiplexed together with a first plurality of media content events; receives a second transport channel, wherein the second transport channel comprises a second portion of the media content event of interest multiplexed together with a second plurality of media content events; demultiplexes the first portion of the media content event of interest from the first transport channel; and demultiplexes the second portion of the media content event of interest from the second transport channel.

BRIEF DESCRIPTION OF THE DRAWINGS

Preferred and alternative embodiments are described in detail below with reference to the following drawings.

DETAILED DESCRIPTION

Figure 1:
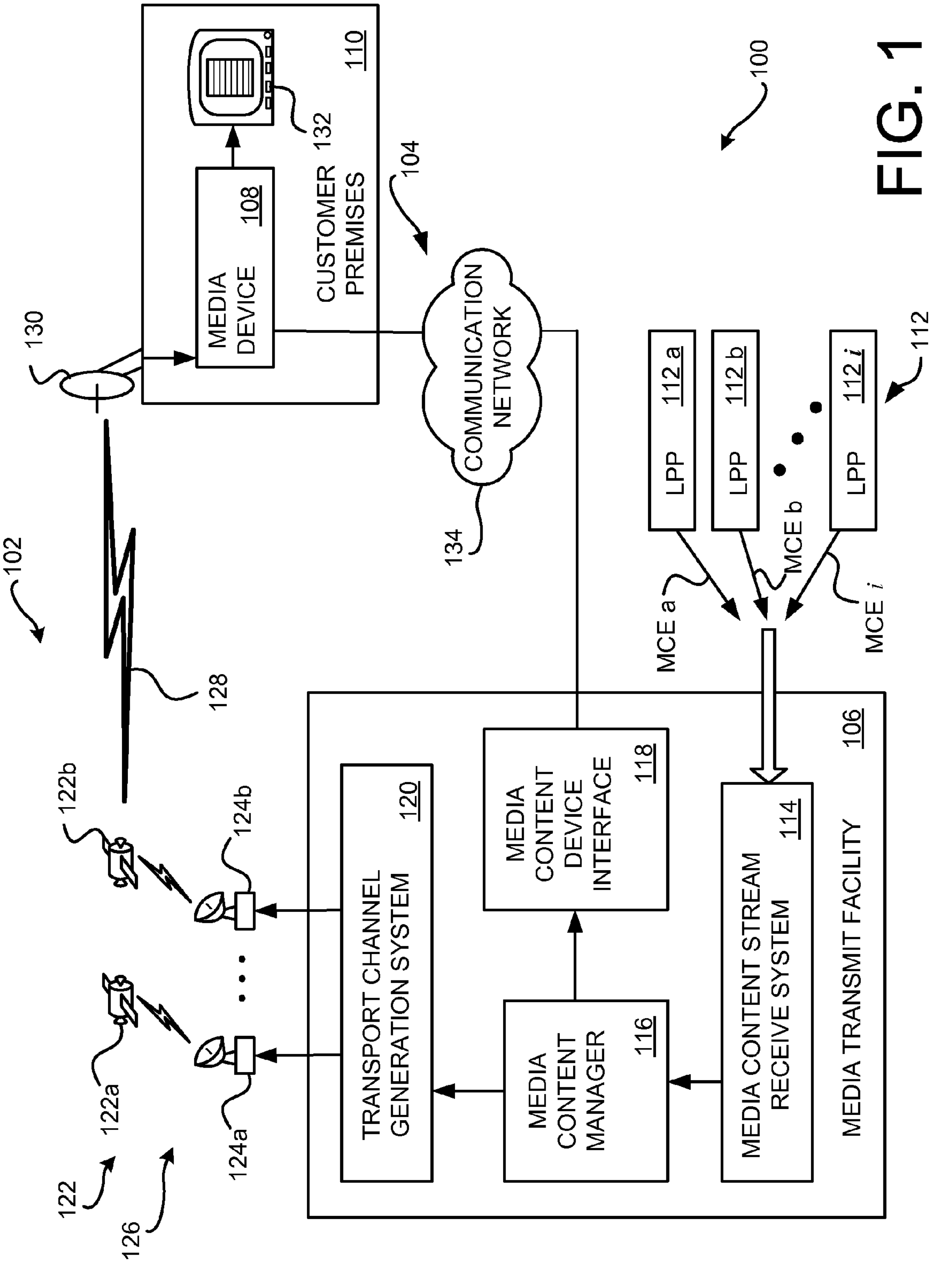
FIG. 1 is a block diagram of an exemplary embodiment of a media content broadcast environment.

FIG. 1 is a block diagram of an exemplary embodiment of an example media content broadcast environment 100 implemented in a satellite-based program content delivery system 102. In overview, a media content provider employs a media communication system to provide media content events to its customers. In the exemplary satellite-based program content delivery system 102, the media provider receives a plurality of media content events (e.g. audio content, video content, data content and/or a combination thereof) MCEa-MCEi from local programming providers 112 (LPPs 112*a*-112*i*). The media content events MCEa-MCEi are communicated to a media transmit facility 106, operated by the media provider and/or media content service providers, and are received by a media content stream receive system 114. In some embodiments, the media transmit facility 106 is configured to provide customers with media content events such as, but not limited to, a multitude of audio/video signals and/or data programming.

The media content stream receive system 114 communicates the received media content events MCEa-MCEi to a media content manager 116. The media content manager 116 processes the received media content events MCEa-MCEi as necessary to prepare them for transmission to the customers of the media provider.

The processed media content events MCEa-MCEi are communicated from the media content manager 116 to a transport channel generation system 120. The transport channel generation system 120 may bundle and/or split selected ones of the media content events MCEa-MCEi. The transport channel generation system 120 may also use the same or different modulation for each satellite transponder. For example, the transport channel generation system 120 may use different modulations, symbol rates and/or code rates.

In an exemplary embodiment, the media content events MCEa-MCEi are bundled and/or split based on the capacity of one or more transponders (FIG. 2) on one or more satellites 122. The bundled and/or split ones of the media content events are then multiplexed to form one or more transport channels. In an exemplary embodiment, by bundling and/or splitting a media content event into the one or more transport channels, the full bandwidth of a satellite transponder may be used.

Various multiplexing techniques are contemplated, including, but not limited to, time division multiplexing, frequency division multiplexing, code division multiplexing, statistical multiplexing, and/or the like. Media content events MCEa-MCEi may be multiplexed in various ways. For example, two distinct media content events may be multiplexed upon a single transport channel, such that an alternating sequence of media content portions, respectively corresponding to the first and the second media content events, is communicated via the transport channel. The number of media content streams that may be communicated via a single transport channel may be based on the bandwidth capacity provided by a transponder on a satellite and the bandwidth utilization of each of the media content streams. For example, if a transponder provides 30 megabits per second (Mbits/s) capacity, and each program content stream consumes four Mbits/s, then as many as seven full media content streams may be communicated via the transport channel.

The transport channel may also include a multiplexed portion of multiple media content event each containing video, audio, and/or data corresponding to the program. Media content portions may comprise MPEG ("Motion Picture Experts Group") packets that contain compressed and/or encrypted video, audio, and/or other data. In addition, media content portions may be encapsulated and/or formatted in other ways, such as by use of other or additional transport, compression, and/or encryption techniques.

Then, the one or more of the multiplexed transport channels are uplinked to one or more satellites 122, via a corresponding transmit antenna 124. The transport channel is uplinked using a wireless signal 126.

The respective transport channels are then communicated from respective ones of the satellites 122 down to a receiver antenna 130 located at the customer premises 110. The received wireless signal 128 with the transport channel therein is then communicated from the receiver antenna 130 to the media device 108. The receiver antenna 130 and the media device 108 may be configured to receive multiple transport channels from a plurality of satellites 122.

A media content event of interest MCEi may be selected by a viewer who provides suitable instructions to the media device 108. The media content event of interest MCEi is identified by its particular "channels" in the received one or more transport channels. In some embodiments portions of the media content event of interest is received over multiple transport channels from multiple satellites 122. The media device 108 retrieves the selected program of interest MCEi from the one or more transport channels based on its assigned identifier, such as a packet identifier (PID) and/or the like.

In an exemplary embodiment, the transmission of the media content event is packetized. Each packet may comprise a header and the packetized content. The header provides identification information pertaining to the contents of the communicated packet. For example, but not limited to, a header may include a device identifier (corresponding to the identity of the media device 108), and a PID (corresponding to information that identifies the particular program content). The packet based system allows the media transmit facility 106 to multicast the media content event. In other words the media content distribution center may simultaneously transmit the media content event to a plurality of media devices 108 over a plurality of satellites 122.

The program of interest MCEi is then assembled into a stream of media content that is communicated from the media device 108 to a media presentation device 132. For example, but not limited to, the media device 108 may be a set top box (STB) that is coupled to the suitable media presentation device 132, such as a television (TV), a digital video disc (DVD) player, a DVD recorder, a game playing device, a mobile device, and/or a personal computer (PC).

The optional communication network 134 is illustrated as a generic communication system. In the various embodiments, the media device 108 and the media transmit facility 106, using media content device interface 118, may be communicatively coupled together via any suitable type of communication network 134. For example, the communication network 134 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media.

The above description of the example media content broadcast environment 100 and the customer premises 110, and the various devices therein, is intended as a broad, non-limiting overview in which various embodiments of a transport channel generation system 120 may be implemented. The media content broadcast environment 100 and the various devices therein, may contain other devices, systems and/or media not specifically described herein.

Figure 2:
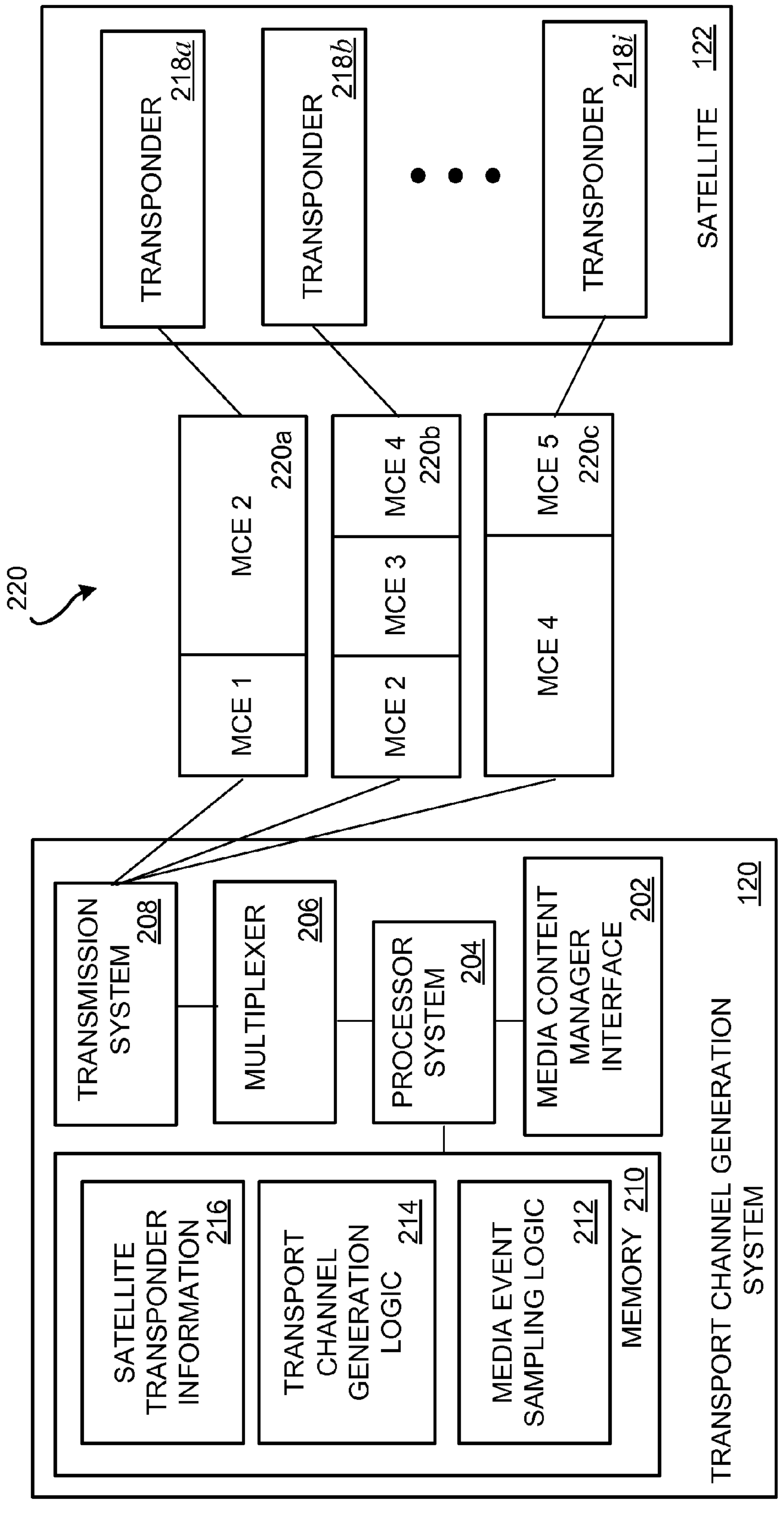
FIG. 2 is a block diagram illustrating multiple media content events multiplexed by an example transport channel generation system.

FIG. 2 is a block diagram illustrating multiple media content events multiplexed by an example transport channel generation system 120. The non-limiting exemplary transport channel generation system 120 comprises a media content manager interface 202, a processor system 204, a multiplexer 206, a transmission system 208 and a memory 210. The memory 210 comprises media event sampling logic 212, transport channel generation logic 214 and satellite transponder information 216. In some embodiments, the media event sampling logic 212 and the transport channel generation logic 214 may be integrated together, and/or may be integrated with other systems. Other transport channel generation systems 120 may include some, or may omit some, of the above-described components. Further, additional components not described herein may be included in alternative embodiments of the transport channel generation system 120.

The exemplary transport channel generation system 120 is configured to receive processed media content events from the media content manager (FIG. 1) and to transmit one or more transport channels 220*a-c* to one or more satellites 122. The non-limiting transport channel generation system 120 includes satellite transponder information 216. The satellite transponder information data store comprises bandwidth information for one or more available transponders 218*a-i* on satellites 122.

The exemplary transport channel generation system 120 is further configured to estimate the bit rate of a transmitting transport stream. Thus once transponder capacity is determined and a bit rate of a transmitting transport stream is determined, the exemplary transport channel generation system 120 may group and/or split one or more portions of the processed media content events into one or more multiplexed transport channels that are configured to increase and/or decrease the usage of the available bandwidth on the transponder 218 of the satellite 122. In an exemplary embodiment is configured to maximize and/or optimize the usage of the available bandwidth on the transponder 218 of the satellite 122.

In an exemplary embodiment, the media content manager interface 202 receives a processed media content event. Then the processor system 204, executing media event sampling logic 212 determines a bit rate of the processed media content event. The bit rate may be determined based on the size of the media content event file, an estimation based on sample bit rates taken during a transmission of the media content event and/or the like.

As is generally known in the art, a bit rate refers to the number of bits used per unit of playback time to represent a continuous medium such as audio or video after data compression. The bit rate of a media content event may correspond to the size of a media content event file in bytes divided by the playback time of the recording (in seconds), multiplied by eight. In alternate embodiments, an average bit rate, a maximum instantaneous bit rate, and/or the like may be determined to represent the bit rate in an exemplary embodiment.

Then, in an exemplary embodiment, the processor system 204, executing the transport channel generation logic 214, generates one or more transport channels 220*a-c* based on the determined bit rate of the processed media content events and on the available bandwidth of the one or more transponders 218. The available transponder bandwidth information may be stored in the satellite transponder information 216. The transponder data stored in the satellite transponder information 216 includes but is not limited to, available bandwidth on one or more transponders 218, capacity of the transponders 218, remaining capacity of the transponder 218 and/or the like.

For example, an example transponder 218*a* may provides 30 Mbits/s capacity, and if the example transponder 218*a* is currently transmitting eight media content events in a transport channels, and if each of the seven media content events is consuming 4 Mbits/s capacity, there is a two Mbit/s under utilization of the transponder. The transport channel generation logic 214 may then split an eighth media content event consuming 4 Mbits/s such that 2 Mbits/s of the eighth media content event is transmitted on the given transponder 218*a*, thus utilizing the entire bandwidth of the transponder 218*a*. The other 2 Mbits/s of the eighth media content event may be transmitted by an alternate transponder 218*b*.

The processor system 204, operating the transport channel generation logic 214, may optionally split a selected processed media content event into two or more portions. The transport channel generation logic 214 may split the processed media content event to fit onto transponders that are currently transmitting only a portion of their available bandwidth capacity. The transport channel generation logic 214 may further group one or more portions of one or more processed media content events based on the bit rate of the portion of the processed media content event. In an alternate embodiment media content events may be grouped based on factors such as popularity, category, length and/or the like.

Alternatively, or additionally, a media content event may be allocated a transmission rate on a transport channel by the transport channel generation logic 214. In some cases the allocated transmission rate may be too low to adequately transmit the media content event to allow for continuous playback. In such cases, the transport generation logic 214 may assign a portion of the media content event to be transmitted on a second transport channel to account for the transmission rate deficiencies and allows for eventual continuous transmission and/or eventual playback on a presentation device.

A transponder capacity may be defined as a transponder bandwidth capacity, thereby defining the upper bound on the amount of data that can be transmitted by the transponder 218. A transponder's bandwidth utilization may indicate the current amount of data currently being transmitted by the transponder 218. A residual bandwidth may indicate the remaining capacity of the transponder 218.

Alternatively and/or additionally, the satellite transponder information 216 may dynamically adjust the portions of the processed media content events based on estimated bandwidth utilization of the transponders 218. For example, some media content events may consume lower amounts of bandwidth due to various factors, such as properties or characteristics of the media content events. For example, higher compression rates may be achieved for some types of media content events, such as those with substantially static images or scenes, resulting in lower bandwidth utilization for such media content events and a corresponding increase in residual bandwidth for a given carrier signal. In such situations, the transport channel generation logic 214 may elect to dynamically utilize the amount and/or bandwidth by increasing the bit rate of other communicated media content events transmitted via the residual bandwidth of the transport channel. For example, the transport channel generation logic 214 executing on the processor system 204, may monitor the amount of residual bandwidth available on a given transport channels, and as sufficient bandwidth capacity becomes available, increase the transmission rates of additional media content being currently communicated via transport channels and/or begin to communicate one or more other additional media content events via the transport channel.

Alternatively and/or additionally, the satellite transponder information 216 may calculate a residual bandwidth of a transponder. In response to the calculated residual bandwidth, the processor system 204 may multiplex a portion of the media content event of interest with a plurality of media content events into a currently transmitting transport channel. The processor system 204 may also dynamically generate an additional transport channel that includes a portion of a media content event of interest already transmitting on a transport channel.

In an exemplary embodiment, once the one or more portions of one or more processed media content events are grouped by the transport channel generation logic 214, the transport channel generation system 120 multiplexes, using the multiplexer 206, the grouped media content event portions into a single data stream to be carried on a transport channel 220. As described herein, a media content event may be transmitted on one or more transport channels 220.

In an exemplary embodiment, the transmission system 208 may also generate a notification that includes transmission information for a media content event. The notification may include transponder frequency information and/or the like so a media device (not shown) may activate one or more tuners to receive a media content event with portions on one or more transport channels 220.

In an exemplary embodiment, the transmission system 208 is configured to transmit the transport channels 220 to the satellites 122. The transmission system may also include one or more modulators and/or encoders (not shown).

In one example, five media content events are transmitted by the transmission system 208 via three transport channels 220*a-c* to transponders 218*a-i* on the satellite 122. More specifically media content event 1 and a portion of media content event 2 are communicated via transport channel 220*a*; an additional portion of media content event 2, media content event 3 and a portion of media content event 4 are transmitted via transport channel 220*b*; and an additional portion of media content event 4 and media content event 5 are communicated via transport channel 220*c*. In this exemplary satellite broadcast environment, the three transport channels 220*a-c* may each correspond to a transponder 218 frequency.

In an exemplary embodiment, a single media content event, such as media content event 2 may be transmitted via multiple distinct transport channels 220*a* and 220*b* over multiple transponders 218*a* and 218*b*. Alternatively, or additionally a single media content event may be split into a plurality of portions and transmitted via a plurality of transport channels over a plurality of transponders. In some example embodiments a portion of a media content event may be the complete media content event or some subset thereof.

Figure 3:
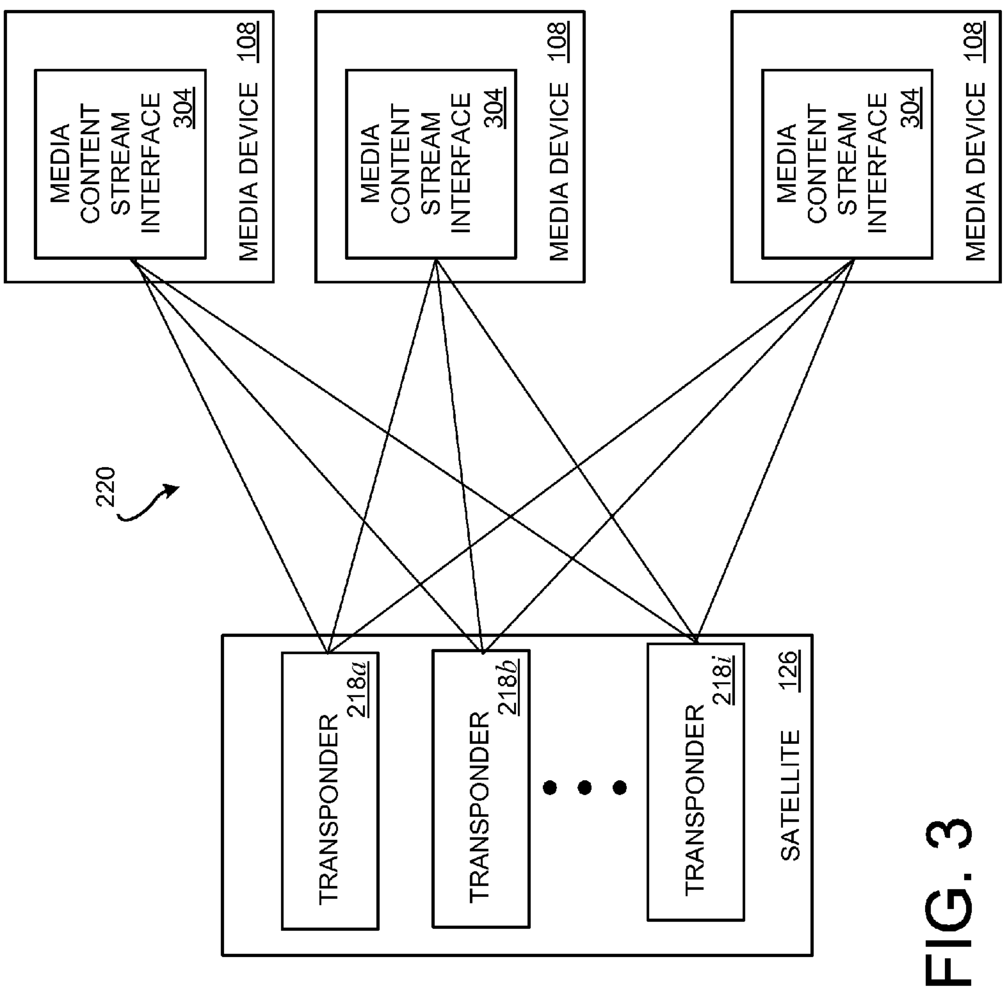
FIG. 3 is a block diagram illustrating multiple programs multiplexed on multiple content streams in an example embodiment.

FIG. 3 is a block diagram illustrating multiple programs multiplexed on multiple transport channels 220 in an example embodiment. The non limiting media devices 108 each include a media content stream interface 304. The media content stream interface 304 is configured to receive one or more portions of a media content event carried via transport channels 220 from one or more transponders 218 in the satellite 122.

The media content stream interface 304 includes one or more tuners (not shown). The tuners may be integrated circuit tuners, advanced television systems committee (ATSC) tuners, data over cable service interface specification (DOCSIS) based tuners and/or the like. Such tuners are configurable to simultaneously tune to two or more separate frequencies of two or more transponders 218 to receive portions of a media content event. As discussed above, the transport channel may include multiplexed video, audio, and/or data corresponding to one or more media content portions transmitted as media content event portions with reference to FIG. 2 above.

In an exemplary embodiment, the media content stream interface 304 facilitates the concurrent demultiplexing and processing of a media content event from one or more transponders 218 from one or more satellites 122. For example when a user instructs the media device 108 to communicate a media content event to a presentation device (not shown), the media content stream interface 304 obtains the portions of the requested media content event from the one or more tuners (not shown).

Figure 4:
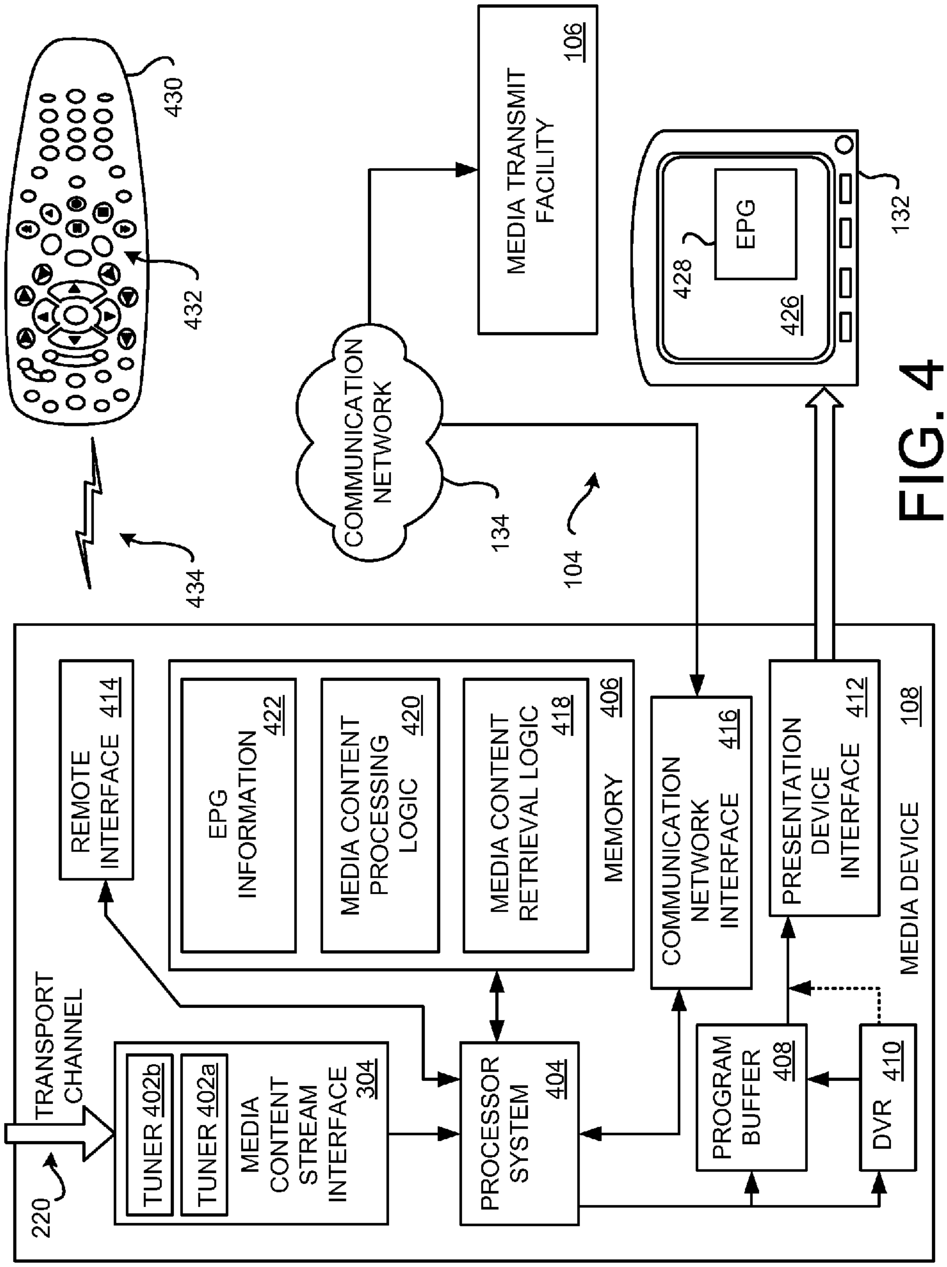
FIG. 4 is a block diagram of an exemplary embodiment of a media device.

FIG. 4 is a block diagram of an exemplary media device 108. The non-limiting exemplary media device 102 comprises a plurality of tuners 402, media content stream interface 304, a processor system 404, a memory 406, a program buffer 408, an optional digital video recorder (DVR) 410, a presentation device interface 412, a remote interface 414, and a communication network interface 416. The memory 406 comprises portions for storing media content decoding logic 418, media content processing logic 420, and electronic program guide (EPG) information 422. In some embodiments, the media content decoding logic 418 and the media content processing logic 420 may be integrated together, and/or may be integrated with other logic. Other media devices 108 may include some, or may omit some, of the above-described media processing components. For example, the media device 108 may comprise and/or be coupled to any suitable recorder that stores media content on a memory medium, such as the exemplary DVR 410. Further, additional components not described herein may be included in alternative embodiments of the media device 108.

The functionality of the media device 102, here a set top box, is now broadly described. One or more transport channels 220 are delivered via one or more transponders on one or more satellites (not shown) that are operated by a media content provider. The one or more transport channels 220 are received by the media content stream interface 304. One or more tuners 402*a*, 402*b* in the media content stream interface 304 may be activated to selectively tune to the frequency of one or more of the transport channels 220 in accordance with instructions received from the processor system 404.

The processor system 404, executing the media content processing logic 420, and based upon a request for a selected media content event of interest specified by a user, operates the media content stream interface 304 to receive a selected media content event, and parses out media content (e.g. packets related to the selected media content event) associated with a selected media content event of interest. The media content event of interest is then assembled into a stream of video and/or audio information which may be stored by the program buffer 408 such that the media content event can be streamed out to the media presentation device 132 via the presentation device interface 412.

Alternatively, or additionally, the processor system 404 may operate the DVR 410 so that parsed out program content is saved into the DVR 410 for later presentation. The DVR 410 may be directly provided in, locally connected to, or remotely connected to, the media device 402.

In this simplified embodiment, the presentation device interface 412 is illustrated as coupled to a media presentation device 132 that includes a display 426, such as a television (hereafter, generically a TV). The video portion of the streamed media content event of interest is displayed on the display 426. The audio portion of the streamed media content event of interest is reproduced as sounds by speakers (not shown).

The exemplary media device 102 is configured to receive commands from a user via a remote control 430 or other suitable user interface (not shown). The remote control 430 includes one or more controllers 432. The user, by actuating one or more of the controllers 434, causes the remote control 432 to generate and transmit commands, via a wireless signal 436, to the media device 108. The commands control the media device 108 and/or control the media presentation device 132. The wireless signal 434 may be an infrared signal and/or an RF signal. Accordingly, the remote interface 414 is configured to receive the wireless signal 434 emitted by the exemplary remote control 430.

Embodiments of the optional communication network interface 416 are configured to communicatively couple the media device 108 with the media transmit facility 106, via the communication network 134. The communication network interface 416 may be any suitable communication device, component, and/or system operable to communicate over the communication network 134.

The media device 108 may receive a notification over the communications network 134 through the communications network interface 416 indicating changes to a broadcast of a transport channel 220. For example, if a media content event is dynamically split between two transport channels, the media device 108 may receive an indication that would provide tuning information for the two transport channels.

The media content retrieval logic 418 provides the logic, when executed by the processor system 404, to manage retrieval of a media content event. For example, the media content retrieval logic 418 may process an instruction to retrieve the selected media content event received from the remote control 430 or another input device.

The media content processing logic 420 manages the various media processing functions. For example, but not limited to, media content processing logic 420 may assemble a demultiplexed media content event in the one or more transport channels 220 into a video stream, audio stream and/or data stream that is communicated to one or more media presentation devices 132.

For example, and referring to FIG. 2, the media content processing logic 420 may manage the receipt of media content event 2. Thereby providing instructions to tuner 402*a* to tune to the transponder 218*a* that is currently transmitting transport channel 220*a*. Tuner 402*b* may then be instructed to tune to the transponder 218*b* that is transmitting transport channel 220*b*. The media content processing logic 420 then may provide instructions to the processor system 404 to demultiplex the portions of media content event 2 of 220*a* and 220*b* and further to store the demultiplexed portions in the program buffer 408 for communication to the presentation device interface 416.

In an exemplary embodiment, a memory medium such as the program buffer 408 may combine demultiplexed portions of the media content event to form a continuous and sequential stream of the media content event of interest. Alternatively, or additionally, the program buffer 408 may optionally store portions of the received media content event until enough of the media content event is received for continuous playback. For example, during peak bit rates, the media content stream interface may be delayed in receiving a portion of the media content event. In such cases, the program buffer may stop playback until enough continuous portions of the media content event are received.

In an exemplary embodiment, the media device 108 may receive a notification from the transport channel generation system (FIG. 2) indicating a transponder frequency currently transmitting a portion of a media content event of interest on a transport channel. In response the processor system 404 may activate a tuner to receive the transport channel comprising the portion of the of the media content event of interest on the indicated transponder frequency.

From time to time, information populating the EPG information 422 residing in the memory 406 is communicated to the media device 108, via the transport channels 220, via backchannel 104 or via another suitable media. The EPG information 422 may provide the media content stream interface 304 with information related to one or more particular transponders that are transmitting the transport channel 220 that contains a requested media content event of interest. In alternate embodiments, similar information may be received thought the backchannel 104 through the communication network interface 412.

It should be emphasized that the above-described embodiments of the media content transmission system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method in a media device that receives a broadcast media content event of interest that is broadcast in media content transport channels from a plurality of satellite transponders to the media device, wherein the media content event of interest comprises at least a first portion followed by a second portion, comprising:

receiving the first portion of the media content event of interest in a first transport channel from a first one of the plurality of satellite transponders, wherein the first transport channel comprises the first portion of the media content event of interest multiplexed together with a first plurality of media content events, wherein the first portion of the media content event of interest is broadcast only in the first transport channel, wherein the media content event of interest and the first plurality of media content events are different media content events, and wherein the first portion of the media content event of interest and the first plurality of media content events utilize a first amount of capacity of the first one of the plurality of satellite transponders;

concurrently receiving a second transport channel from a second one of the plurality of satellite transponders, wherein the second transport channel comprises a second plurality of media content events, wherein the second plurality of media content events are different media content events and are different from the media content event of interest, and wherein the second plurality of media content events utilize a second amount of capacity of the second one of the plurality of satellite transponders;

demultiplexing the first portion of the media content event of interest from the first transport channel;

receiving a notification that identifies the second transport channel as being the transport channel that will receive the second portion of the media content event of interest when the second portion of the media content event of interest is broadcast;

receiving the second portion of the media content event of interest in the second transport channel after the first portion of the media content event of interest has been received in the first transport channel and is no longer broadcast in the first transport channel, wherein the second portion of the media content event of interest resides only in the second transport channel, wherein after the first portion of the media content event of interest has been broadcast and is no longer in the first transport channel, the first amount of utilized capacity of the first one of the plurality of satellite transponders decreases, and wherein when the second portion of the media content event of interest is received in the second transport channel, the second amount of utilized capacity of the second one of the plurality of satellite transponders increases; and demultiplexing the second portion of the media content event of interest from the second transport channel.

2. The method of claim 1, wherein the first transport channel is communicated from a first satellite, and wherein the second transport channel is communicated from a second satellite.

3. The method of claim 1 further comprising:

storing the demultiplexed first portion of the media content event of interest;

storing the demultiplexed second portion of the media content event of interest;

combining the demultiplexed first portion of the media content event of interest and the demultiplexed second portion of the media content event of interest to generate a combined media content event of interest; and communicating the combined media content event of interest to a presentation device.

4. The method of claim 3 further comprising:

communicating the combined media content event of interest to the presentation device when a program buffer contains a sufficient amount of the media content event of interest to enable continuous playback on the presentation device.

5. The method of claim 1 further comprising:

tuning to a first frequency to receive the first portion of the media content event of interest, wherein the first one of the plurality of satellite transponders currently transmitting the first transport channel transmits on the first frequency; and concurrently tuning to a second frequency to receive the second portion of the media content event of interest, wherein the second one of the plurality of satellite transponders currently transmitting the second transport channel transmits on the second frequency.

6. The method of claim 1, wherein receiving the notification comprises:

receiving a first notification from a transport channel generation system indicating a first transponder frequency currently transmitting the first portion of the media content event of interest on the first transport channel;

receiving a second notification from the transport channel generation system indicating a second transponder frequency that will be transmitting the second portion of the media content event of interest on the second transport channel when the second portion of the media content event of interest is broadcast; and activating a first tuner to receive the first transport channel comprising the first portion of the media content event of interest on the indicated first transponder frequency; and activating a second tuner to receive the second transport channel on the indicated second transponder frequency, wherein the second tuner is activated to receive the second transport channel prior to the broadcast of the second portion of the media content event of interest.

7. The method of claim 6 further comprising:

receiving a third notification from the transport channel generation system indicating a third transponder frequency that will be transmitting a third portion of the media content event of interest on a third transport channel prior to the broadcast of the second portion of the media content event of interest; and activating a third tuner to receive the third transport channel comprising the third portion of the media content event of interest on the indicated third transponder frequency prior to broadcast of the third portion of the media content event of interest.

8. The method of claim 1 further comprising:

tuning a tuner of the media device to a first frequency to receive the first portion of the media content event of interest, wherein the first one of the plurality of satellite transponders currently transmitting the first transport channel transmits on the first frequency; and tuning the tuner of the media device to a second frequency to receive the second portion of the media content event of interest, wherein the tuning to the second frequency occurs after the broadcast of the first portion of the media content event of interest ends and when the broadcast of the second portion of the media content event of interest begins.

9. A media device that receives media content transport channels from multiple transponders, comprising:

a first tuner operable to receive a first transport channel from a first satellite transponder;

a second tuner operable to receive a second transport channel from a second satellite transponder; and a processor system communicatively coupled to the first tuner and the second tuner, wherein the processor system is configured to:

process the received first transport channel, wherein the first transport channel comprises a first portion of a media content event of interest multiplexed together with a first plurality of media content events, wherein the first portion of the media content event of interest is broadcast only in the first transport channel;

process the received second transport channel, wherein the second transport channel comprises a second portion of the media content event of interest multiplexed together with a second plurality of media content events, wherein the second portion of the media content event of interest is broadcast only in the second transport channel, and wherein the second portion of the media content event of interest is broadcast in the second transport channel after broadcast of the first portion of the media content event of interest in the first transport channel ends;

demultiplex the first portion of the media content event of interest from the first transport channel as the broadcast first portion of the media content event of interest is being received; and demultiplex the second portion of the media content event of interest from the second transport channel as the broadcast second portion of the media content event of interest is being received.

10. The media device of claim 9 wherein the first transport channel is communicated from a first satellite and the second transport channel is communicated from a second satellite.

11. The media device of claim 9 further comprising:

a memory medium communicatively coupled to the first tuner, the second tuner and the processor system, wherein the memory medium is configured to:

store the demultiplexed first portion of the media content event of interest; and store the demultiplexed second portion of the media content event of interest; and wherein the processor system is further configured to combine the demultiplexed first portion of the first media content event of interest and the demultiplexed second portion of the media content event of interest to generate the media content event of interest; and a presentation device interface communicatively coupled to the memory medium and the processor system, wherein the presentation device interface is configured to communicate the combined first portion and second portion of the media content event of interest to a presentation device.

12. The media device of claim 9, wherein the first tuner is further configured to tune to a first frequency to receive the first portion of the media content event of interest when the first portion of the media content event of interest is being broadcast only in the first transport channel, wherein the first frequency corresponds to a first transponder currently transmitting the first transport channel at the first frequency; and wherein the second tuner is further configured to concurrently tune to a second frequency to receive the second portion of the media content event of interest prior to broadcast of the second portion of the media content event of interest in the second transport channel, wherein the second frequency corresponds to a second transponder currently transmitting the second transport channel at the second frequency.

13. The media device of claim 9 further comprising:

a communications network interface configured to:

receive a notification from a transport channel generation system indicating a first transponder frequency currently transmitting the first portion of the media content event of interest on the first transport channel; and receive a notification from the transport channel generation system indicating a second transponder frequency currently transmitting the second portion of the media content event of interest on the second transport channel; and wherein the processor system is further configured to:

activate the first tuner to receive the first transport channel comprising the first portion of the media content event of interest on the indicated first transponder frequency; and activate the second tuner to receive the second transport channel comprising the second portion of the media content event of interest on the indicated second transponder frequency.

14. The media device of claim 13 wherein the communications network interface is further configured to:

process a received notification from the transport channel generation system indicating a third transponder frequency currently transmitting a third portion of the media content event of interest on a third transport channel; and wherein the processor system is further configured to a third tuner to receive the third transport channel comprising the third portion of the media content event of interest on the indicated third transponder frequency.

15. A media content event broadcasting method, comprising:

generating a first transport channel that is communicated from one of a plurality of satellite transponders broadcasting to a plurality of media devices, wherein the first transport channel comprises a first portion of a media content event of interest multiplexed together with a first plurality of media content events, wherein the first portion of the media content event of interest is broadcast only in the first transport channel, wherein the media content event of interest and the first plurality of media content events are different media content events, and wherein the first portion of the media content event of interest and the first plurality of media content events utilize a first amount of capacity of a first one of the plurality of satellite transponders;

generating a second transport channel that is communicated from one of the plurality of satellite transponders broadcasting to the plurality of media devices, wherein the second transport channel comprises a second plurality of media content events multiplexed together;

wherein the second plurality of media content events are different media content events and are different from the media content event of interest, and wherein the second plurality of media content events utilize a second amount of capacity of a second one of the plurality of satellite transponders;

transmitting the first transport channel to a first transponder of a first satellite; and concurrently transmitting the second transport channel to a second transponder on a second satellite, wherein the method, after the first portion of the media content event of interest is broadcast, further comprises:

generating the second transport channel, wherein the second transport channel then comprises a second portion of the media content event of interest multiplexed together with the second plurality of media content events, wherein presentation of the second portion of the media content event of interest follows presentation of the first portion of the media content event of interest when the media content event of interest is presented to a user, wherein the second portion of the media content event of interest is broadcast only in the second transport channel, wherein after the first portion of the media content event of interest has been broadcast and is no longer in the first transport channel, the first amount of utilized capacity of the first one of the plurality of satellite transponders decreases, wherein when the second portion of the media content event of interest is broadcast in the second transport channel, the second amount of utilized capacity of the second one of the plurality of satellite transponders increases.

16. The method of claim 15 further comprises:

calculating a residual bandwidth of the first transponder; and multiplexing the first portion of the media content event of interest with a plurality of media content events into a currently transmitting transport channel, wherein the first portion of the media content event of interest is less than the calculated residual bandwidth available on the first transponder.

17. The method of claim 15 further comprises:

calculating a residual bandwidth of the first transponder currently transmitting a transport channel; and dynamically generating an additional transport channel when the calculated residual bandwidth of the first transponder is substantially equal to a bandwidth capacity of the first transponder, wherein the additional transport channel includes the second portion of the media content event of interest transmitting on the transport channel.

18. The method of claim 15 further comprises:

calculating a residual bandwidth of the first transponder; and dynamically multiplexing the first portion of the media content event of interest with the second portion of the media content event of interest and the plurality of media content events onto the second transport channel when the calculated residual bandwidth of the first transponder is greater than the bandwidth utilization of the second transport channel, wherein the first transport channel is no longer transmitting the media content event of interest.

19. The method of claim 18 further comprises:

calculating a residual bandwidth of the second transponder; and dynamically multiplexing the second portion of the media content event of interest with the first portion of the media content event of interest and the plurality of media content events onto the first transport channel when the calculated residual bandwidth of the second transponder is greater than the bandwidth utilization of the first transport channel, wherein the second transport channel is no longer transmitting the media content event of interest.

20. The method of claim 15 further comprises generating a notification to a media device, wherein the notification indicates one or more transponder frequencies currently transmitting a portion of the media content event of interest.

* * * * *